June 1, 1948.    T. W. PAUL    2,442,731
POWER TRANSMISSION FOR AGRICULTURAL IMPLEMENTS
Filed Aug. 5, 1944    2 Sheets-Sheet 1

WITNESS
E. B. Bjurstrom

INVENTOR.
TALBERT W. PAUL
BY
ATTORNEYS

June 1, 1948. T. W. PAUL 2,442,731
POWER TRANSMISSION FOR AGRICULTURAL IMPLEMENTS
Filed Aug. 5, 1944 2 Sheets-Sheet 2

WITNESS
E. B. Bjurstrom

INVENTOR.
TALBERT W. PAUL
BY
ATTORNEYS

Patented June 1, 1948

2,442,731

UNITED STATES PATENT OFFICE 2,442,731

POWER TRANSMISSION FOR AGRICULTURAL IMPLEMENTS

Talbert W. Paul, Moline, Ill., assignor to Deere & Company, Moline, Ill., a corporation of Illinois Application August 5, 1944, Serial No. 548,285

13 Claims. (Cl. 97—40)

1

The present invention relates generally to agricultural implements and more particularly to implements of the soil-working type.

The object and general nature of the present invention is the provision of new and improved means for driving an implement of the rotary tiller type from a farm tractor. More specifically, it is a feature of this invention to provide a simple inexpensive drive for operating a rotary tiller from the power take-off shaft of a farm tractor, which driving means provides for the necessary high speed operation of the rotary tiller and the vertical swinging of the tiller as a unit relative to the tractor, without requiring expensive and troublesome universal joints in the drive. Another feature of this invention is the provision of a new and improved belt drive for actuating a farm implement of the rotary tiller type from the power take-off shaft of a farm tractor, which belt drive is so constructed and arranged as to accommodate movement of the tiller unit relative to the tractor without changing the effective length of the driving belt during the swinging action.

An additional feature of the present invention is the provision of a belt drive arrangement which is especially constructed to accommodate movement of one of the driving and driven elements relative to the other about an axis without requiring any change in the length of the belt. It is also an important feature of this invention to provide a belt drive arrangement in which the swinging of one part relative to the other about an axis is accommodated merely by torsional displacement or twisting of portions of the belt which are arranged to lie in coincidental relationship with said axis. An additional feature of this invention is the provision of a belt drive arrangement in which relatively movable parts are connected in driving relation by a driving belt which, through one or more idlers, is constrained to lie in the axis of relative movement between said driving and driven parts, the belt drive including driving and driven pulleys arranged so that a line coinciding with said axis passes in tangential relation with said driving and driven pulleys.

Further, an additional feature of the present invention is the provision of a slow drive attachment for farm tractors and the like which, deriving power from the power take-off shaft that drives the tilling unit at relatively high speed, provides for driving the tractor which propels the tool at a relatively slow speed, entirely independent of the conventional tractor transmission.

These and other objects and advantages of the present invention will be apparent to those skilled in the art after a consideration of the following detailed description, taken in conjunction with the accompanying drawings in which the preferred forms of the invention have been illustrated.

Figure 1:
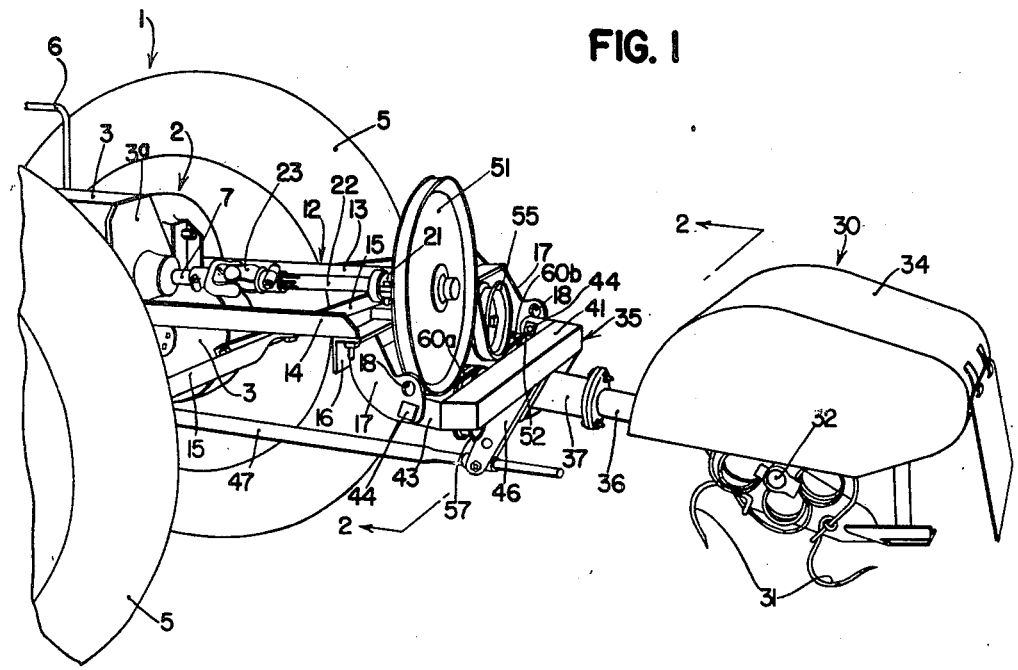
Figure 1 is a view of a rotary tiller connected for vertical swinging movement with a farm tractor, in connection with driving mechanism incorporating the principles of the present invention.
Figure 2:
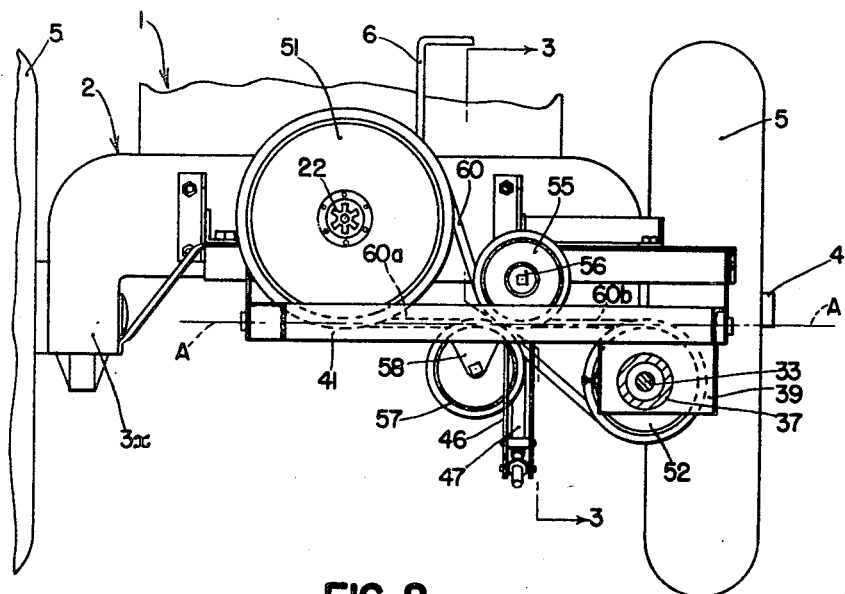
Figure 2 is a rear view, taken generally along the line 2—2 of Figure 1.

Referring first to Figures 1 and 2, a farm tractor, generally of conventional construction so far as the present invention is concerned, is indicated in Figure 1 by the reference numeral 1 and includes a rear axle structure 2 having depending portions 3x in which axles 4 are journaled for rotation. Drive wheels 5 are fixed in any suitable way to the axles 4, preferably for tread adjustment where desired. Carried at least partly by the rear axle structure 2 is a speed change transmission 3, the gear selection being accomplished by any suitable means, such as a gear shift lever 6. A power take-off shaft 7 extends rearwardly from the rear axle 2 and is driven from the tractor motor (not shown) independently of the particular gear ratio selected in the transmission 3. The power take-off shaft 7 may be connected or disconnected from the tractor motor by means of a clutch (not shown) which, when engaged, provides for driving the power take-off shaft 7 even though the transmission 3 may be neutral.

A supporting framework 12 is attached to the rear axle 2 and includes right and left hand angles 13 and 14, together with suitable braces 15, and a rear angle 16. Downwardly and rearwardly extending brackets 17 are fixed, as by welding, to the rear angle 16 and each is provided with a pair of openings 18. The angle 16 of the framework 12 carries a bearing structure 21 in which the rear end of an extension 22 of the power take-off shaft 7 is journaled for rotation, the forward end of the extension shaft 22 being connected to the rear end of the power take-off shaft 7 proper by means of a universal joint 23.

The present invention is particularly adapted for connecting a farm implement, such as a rotary tiller, to a farm tractor, and a rotary tiller of the power driven type is indicated in its entirety in Figure 1 by the reference numeral 30. The present invention is not concerned with the details of the rotary tiller 30, it being sufficient to note that the implement 30 includes a plurality of soil working tines 31 connected to be rotated by a transverse shaft 32 which, through suitable gearing (not shown) is adapted to be driven by a shaft 33 that extends longitudinally. A cover or shield 34 encloses the upper portions of the rotatable tines. The implement 30 is fixedly connected to a framework 35 which includes tubular sections 36 and 37 suitably connected together in rigid relationship and to which the cover 34 and other parts of the tiller 30 are connected. The forward section 37 is in the nature of a tubular supporting sleeve and at its forward end is fixed to a depending bracket 39 welded or otherwise connected to an angle 41 forming a part of the framework 35. A pair of brackets 42 and 43 are fixed, respectively, to the ends of the angle 41 and are connected to the lower portions of the brackets 17 by pivot members 44. The pivot members 44 may take the form of bolts and may be disposed in one or the other of the sets of openings 18 formed in the tractor brackets 17, and thus establish a transverse axis about which the tiller framework 35 swings with respect to the framework 12 carried on the tractor. A depending arm 46 is fixed to the angle 41 and at its lower end is connected to a push bar 47 by which the tiller 30 may be raised out of ground engaging or operating position or lowered into contact with the ground, as desired.

The present invention is more particularly concerned with a novel and simplified drive for operatively connecting the driving shaft 33 of the tiller with the power take-off shafts 7, 22 of the tractor. It will be noted, particularly from Figure 2, that the tiller unit 30 preferably is carried on the tractor generally at one side thereof so that it is not necessary for the tractor wheel 5 at that side of the tractor to run over previously tilled ground. This disposes the shaft 33 at one side of and below the power take-off shaft section 22.

Figure 3:
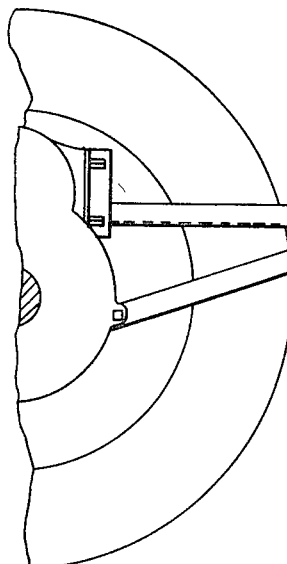
Figure 3 is a view taken generally along the line 3—3 of Figure 2.

The drive between the shafts 22 and 33 will now be described. A relatively large driving pulley or sheave 51 is fixed to the rear end of the power take-off shaft extension 22 and, as best shown in Figure 2, is arranged so that the axis of swinging action of the tiller 30, indicated by the dash and dot line A in Figure 2 and defined by the pivot members 44 (Figure 1) passes substantially in tangential relationship with the sheave 51. A driven pulley or sheave 52 is fixed in any suitable manner to the forward end of the tiller drive shaft 33 and the sheave or pulley 52 likewise is disposed so that the line A coincidental with the axis defined by the pivot bolts 44, passes in tangential relationship with respect to the pulley 52. The latter, it will be noted, is carried by the swinging frame 35 while the driving sheave or pulley 51 is carried by the tractor frame 12. The latter also carries an idler sheave or pulley 55 which is supported by suitable bearing means 56 on an angle bracket 57x (Figure 3) that is fixed to the main frame cross angle 16. The axis line A is also tangent to the idler sheave 55. A second idler sheave 57 is supported for rotation on a bracket 58 fixed to the angle 41 of the swinging frame 35, and as best shown in Figure 2, the axis line A is also tangent to the idler 57. A driving belt 60 is trained about the pulleys or sheaves 51, 52, 55 and 57 and, by virtue of the tangential relationships just referred to, portions 60a and 60b of the belt 60 lie substantially in the axis line A, the pulley 55 on the tractor carried frame being between the idler 57 and the driven pulley 52 on the swinging frame, whereby the two belt portions 60a and 60b are separated one from the other in an axial relation so as to accommodate the swinging of the framework 35 relative to the framework 12 without any of the parts colliding. It will be seen that since the portions 60a and 60b of the belt 60 lie in the axis A, no shortening or lengthening of the belt occurs when one frame swings relative to the other, such relative movement being accommodated by slight torsional displacement or twisting of the belt portions 60a and 60b. The belt 60 may, of course, be a V-belt, round belt, flat belt, or any other suitable means. It will also be noted that the driving pulley or sheave 51 is considerably larger than the driven pulley or sheave 52. This provides the desired high speed rotation of the tiller shaft 33 while the forward advance of the outfit, with the transmission 3 arranged in low gear, is relatively slow, as is frequently desired in a tool of this type, especially where it is desired to thoroughly pulverize the soil.

Figure 4:
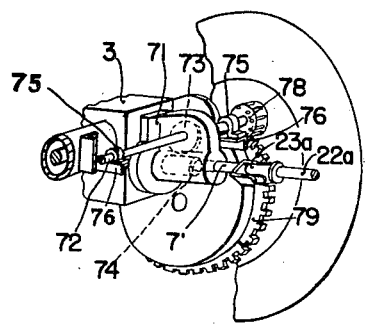
Figure 4 is a view similar to Figure 1, showing my improved slow drive attachment especially adapted for tillers of the type illustrated in Figure 1.

In certain conditions where extreme fineness of tilth is desired, it may occur that a farm tractor with conventional transmission gearing may not drive the rotary tiller at the required rate of rotation, even when the conventional transmission gearing is in low gear, if the ground travel of the outfit is reduced to that required for the extreme fineness desired. To provide for reducing the tractor's ground travel while, at the same time, permitting the motor to operate at sufficient speed to drive the rotary tiller tools at relatively high speed, I have devised a slow-drive attachment for use with the outfit shown in Figure 1. Referring now to Figure 4, the rear plate 3a (Figure 1) of the tractor transmission 3 is replaced by a gear housing 71 having a shaft 72 extending therethrough. The central portion of the shaft 72 is fixed in any suitable manner to a worm gear 73. The power take-off shaft 7 extends through the housing 71 and carries a worm 74 which meshes with the worm gear 73. The ends of the transverse slow drive shaft 72 are supported by suitable bearings 75 carried by brackets 76 that are fixed to the rear axle 2 of the tractor in any suitable manner. At each end of the shaft 72 a driving pinion 78 is fixed, and each driving pinion 78 meshes with an auxiliary gear 79 that is detachably connected with the associated tractor wheel 5 and/or its drive axle 4. The power take-off shaft 7 of the tractor is connected by a universal joint 23a and a power take-off shaft extension 22a to drive the rotary tiller in substantially the manner illustrated in Figure 1.

In using the slow drive attachment, the tractor transmission 3 is placed in neutral and the clutch for driving the power take-off shaft 7 is engaged. Not only does this drive the rotary tiller but it also drives the auxiliary shaft 72 at a relatively slow speed through the worm gearing 73, 74, and the pinions 78, being much smaller than the auxiliary detachable gears 79, therefore drive the tractor wheels 5 at the desired slow rate, thus enabling the tiller rotor to be driven at the desired high rate of speed necessary for extreme fineness of pulverization.

I have shown in Figures 1 and 2 an arrangement for drivingly connecting a pair of relatively swingable parts, one of which is adapted to be swung relative to the other about an axis, utilizing as a driving medium a belt trained so that portions thereof coincide with the axis of relative movement whereby the latter may be accommodated merely by twisting of the belt, without entailing any variation in the effective length of the belt. A drive of this kind is thus extremely simple and quiet and does not require expensive universal joints or any torsional vibrations incident to the use of a single universal joint. The principles of a drive of this type may readily be incorporated in a driving arrangement that accommodates movement of one part with respect to the other about a plurality of axes.

Figure 5:
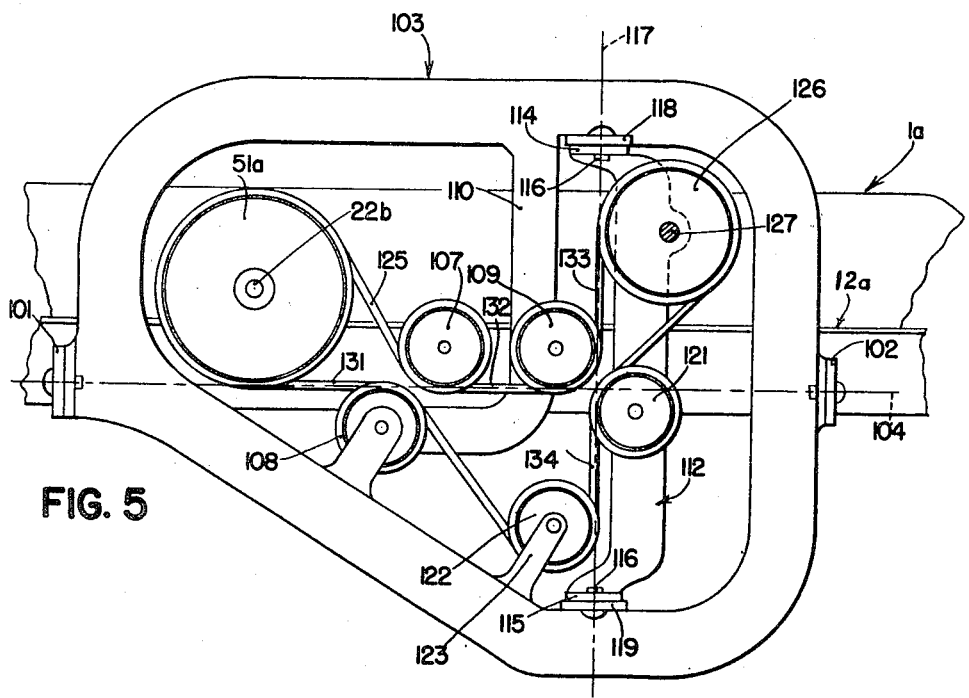
Figure 5 is a view similar to Figure 2, illustrating a belt drive arrangement in which movement of the driving and driven units, one with respect to the other, about two different axes, is accommodated.

Referring now to Figure 5, the tractor indicated at 1a supports a suitable framework 12a in which a driving shaft 22b is mounted for rotation. A driving sheave or pulley 51a is mounted on the driving shaft 22b. The frame 12a carries a pair of brackets 101 and 102 in which a first swinging frame 103 is pivotally mounted for movement about an axis 104. The frame 12a carries an idler 107 and the first swinging frame 103 carries a pair of idlers 108 and 109, the latter idlers being mounted upon a cross member 110 forming a part of the first swinging frame 103. A second swinging frame 112 is provided with a pair of ears 114 and 115 which are apertured to receive pivot pins 116 by which the frame 112 is pivotally supported for movement about a vertical axis 117. Ears 118 and 119 on the first swinging frame 103 carry the pivot pins 116. An idler 121 is supported for rotation on the second swinging frame 112, and a fourth idler 122 is supported for rotation on a bracket 123 carried by the first swinging frame 103. A belt 125 is trained around the several pulleys or sheaves mentioned above, and including a driven pulley 126 mounted on a driven shaft 127. As will be seen from Figure 5, the belt 125 is positioned by the idler sheaves 107, 108 and 109 so as to establish belt portions 131 and 132 in coincidence with the first axis 104 of swinging movement between the relatively stationary frame 12a and the first swinging frame 103. The other idlers 109, 121 and 122 position the belt 125 to establish portions 133 and 134 that lie in coincidence with the axis 117 about which the second swinging frame 112 may swing relative to the first swinging frame 103. Through suitable bracket means (not shown) the driven shaft 127 is constrained to swing with the second swingable frame 112 in the same manner that the rotary tiller shaft 33 swings with the framework 35 in the form of the invention shown in Figures 1–3.

Referring again to Figure 5, it will be seen that when the first frame 103 swings about the axis 104 relative to the tractor carried frame 12a, the belt portions 131 and 132 are twisted or torsionally displaced slightly to accommodate such swinging movement but that there is no change in the length of the belt required. Likewise, the second frame 112 swings relative to the first frame 103 about an axis 117, and since the belt portions 133 and 134 lie in the axis 117, the swinging movement of the frame 112 relative to the frame 103 does not require any change in the length of the belt but only a torsional displacement or twisting of the belt portions 133 and 134. In this way I have provided a simple and silent drive between a driving shaft (22b) and a driven shaft (127) which accommodates movement of one shaft relative to the other about two axes but without requiring the installation of any universal joints and with the added advantage that any desired ratio, either increasing or decreasing the speed of the driven shaft, as desired, may be secured.

While I have shown and described above the preferred structure in which the principles of the present invention may be incorporated, it is to be understood that my invention is not to be limited to the particular details shown and described above, but that, in fact, widely different means may be employed in the practice of the broader aspects of my invention.

What I claim, therefore, and desire to secure by Letters Patent is:

1. In an agricultural implement, a support having a source of power, an operating unit swingably connected with said support for movement relative thereto about a transverse axis, a driving pulley on said support, a driven pulley on said unit disposed to one side of said driving pulley in a position such that a tangent line extending from one pulley to the other substantially coincides with said axis, a driving belt trained around said driving and driven pulleys, and a pair of idlers, one supported on said support and the other supported on said unit carried in such positions that the portion of the belt extending from one pulley to one idler and the portion of the belt that extends from the other idler to the other pulley lie in said axis, whereby the drive may be transmitted from said source of power to said unit and accommodate swinging of the latter about said axis with no change in the effective length of said belt and only twisting in said belt portions when said unit swings about said axis relative to said support.

2. In an agricultural machine, the combination with a tractor including a source of power and a power driven implement unit adapted to be connected with the tractor for swinging movement relative thereto about an axis, of a belt drive for connecting said implement with the source of power on the tractor comprising a pair of driving and driven pulleys connected, respectively, with said source of power and said implement and arranged so that the tangent line connecting said pulleys coincides with said axis of swinging movement, and a belt trained around said pulleys and arranged so that a portion of said belt lies in said tangent line, whereby swinging movement of said implement relative to said tractor is accommodated by twisting of the portion of the belt that extends along said tangent line.

3. In an agricultural machine, the combination with a tractor having a generally longitudinally extending power take-off shaft and an implement including a shaft to be driven and connected generally at one side of said tractor, of a power transmission drive between said power take-off shaft and said driven shaft, comprising a driving pulley fixed to said power take-off shaft, a driven pulley fixed to said implement shaft, means connecting said implement with the tractor for generally pivotal movement relative thereto about an axis, said last mentioned means being positioned with respect to said pulleys so that the axis of movement of the implement relative to the tractor extends in generally tangential relationship with respect to said pulleys, belt means trained about said pulleys, and idler means defining the position of said belt means so that portions of said belt in operation lie in said axis so as to accommodate swinging movement of the driven pulley and the implement relative to the tractor and the driving pulley about said pivotal axis.

4. In a belt transmission apparatus adapted to transmit power between a pair of driving and driven members supported, respectively, for movement about an axis, comprising a driving pulley, a driven pulley, means connecting said pulleys, respectively, with said driving and driven members whereby a line extending coincidental with said axis lies in tangential relation with respect to said pulleys with one of the latter on one side of said axis and the other on the other side of said axis, a driving belt trained over said pulleys, an idler means cooperating with said belt and constraining portions thereof to lie in said axis whereby pivotal movement of one of said members relative to the other about said axis effects no change in effective length of the belt but only portional displacement in the portions of the belt extending along said pivot axis.

5. In a belt transmission apparatus adapted to transmit power between a pair of driving and driven members supported, respectively, for movement about an axis, comprising a driving pulley, a driven pulley, means connecting said pulleys, respectively, with said driving and driven members whereby a line extending coincidental with said axis lies in tangential relation with respect to said pulleys with one of the latter on one side of said axis and the other on the other side of said axis, a driving belt trained over said pulleys, a pair of idler pulleys supported, respectively, for swinging movement with said driving and driven pulleys and serving to dispose portions of said belt in said tangential axis.

6. In power transmission apparatus, a pair of supporting members pivotally connected together for movement one relative to the other about an axis, a driving pulley supported for rotation on one of said members, a driven pulley supported for rotation on the other of said members, said pulleys being arranged so that a line passing through said axis extends in tangential relationship with respect to said pulleys, a pair of idler pulleys, means supporting one of said idler pulleys on the supporting member that carries the driving pulley but arranged also in tangential relationship with respect to a line extending through said axis and disposed adjacent the driven pulley, means supporting the second idler pulley on the other of said supporting members and disposing the second idler pulley in a position also tangential with respect to said axis and disposed between said first idler pulley and said driving pulley, and a belt trained over said driving and driven pulleys and passing around said idler pulleys, the latter serving to dispose portions of said belt substantially in said axis, whereby said drive accommodates movement of one supporting member relative to the other about said axis solely by virtue of twisting said axial portions of said belt.

7. A power transmission device for transmitting power between relatively movable units, comprising three supports, means connecting one of said supports to a second support for movement relative to the latter about an axis, means connecting the third support to said first support for movement relative to the latter about an axis that extends at an angle with respect to said first-mentioned axis, a driving member including a driving pulley supported for rotation on said second support and disposed thereon in a position so that a line extending along said first axis is disposed in tangential relationship with respect to said driving pulley, a driven pulley supported for rotation on said third support and disposed in a position thereon so that a line extending along said second axis extends in tangential relationship with respect to said driven pulley, and a plurality of idlers carried by said three supports and disposed respectively thereon in such positions that a belt trained over said driving and driven pulleys includes portions lying in each of said two axes whereby said third support may swing relative to said second support about said second axis and both said third support and said first support may swing relative to said second support about the first axis, without changing the effective length of said belt, movement of said supports about said axes being accommodated by twisting of said axial portions of said belt.

8. In an agricultural machine, the combination with a tractor having a rear axle, a power take-off shaft extending rearwardly therefrom, and a pair of laterally spaced propelling wheels journalled for rotation in said rear axle, of a soil working implement comprising a rotatable member adapted to be driven at high speed, a framework supporting said rotatable member and hingedly connected with said rear axle for generally vertical swinging movement about a transverse axis, the rotatable member of said implement extending generally longitudinally and disposed adjacent one side of the tractor laterally of said power take-off shaft, a relatively small driven pulley mounted on said rotatable member and rockable with said framework about said axis, a relatively large driving pulley supported on the tractor and connected with said power take-off shaft to receive power therefrom, and driving means connecting said driving and driven pulleys and including a driving belt having portions extending in line with said axis so as to accommodate vertical swinging of said framework without changing the effective length of said driving belt.

9. In an agricultural machine, the combination with a tractor having a rear axle, laterally spaced driving wheels carried thereby, means including a speed change transmission for driving said wheels at selected rates, and a power take-off shaft extending rearwardly from said rear axle and driven at substantially the same speed irrespective of the speed at which said drive wheels are driven, of a ground working implement including a rotatable member, a framework in which said rotatable member is mounted for rotation generally at one side of and below said power take-off shaft, means pivotally connecting said framework with the rear axle of said tractor for generally vertical swinging movement about a transverse axis, a step-up drive connecting said power take-off shaft and said rotatable member, comprising a relatively small pulley on the forward end of said rotatable member, a relatively large driving pulley on the rear portion of said power take-off shaft, a first idler pulley carried by said framework, a second idler pulley carried by the tractor, said pulleys being arranged so that a tangential line substantially touching all of said pulleys substantially coincides with the axis of pivotal swinging of said framework, and a driving belt trained around said pulleys and including portions lying substantially in said pivot axis whereby swinging of said framework effects no change in the effective length of said driving belt but only twisting in the portions thereof lying in said axis.

10. An agricultural machine comprising a tractor having a source of power and a power take-off shaft, a rotary tiller having a drive shaft, means swingably connecting said tiller with the tractor for movement relative thereto about a transverse axis, a belt drive connecting said shafts and including a portion moving in line with said axis so as to accommodate swinging movement of said tiller about said axis, and means actuated from the tractor for raising and lowering said tiller.

11. An agricultural machine as defined in claim 10, further characterized by said raising and lowering means including an arm for swinging said tiller and a push bar connected with said arm.

12. In a belt transmission apparatus adapted to transmit power between a pair of driving and driven members, means for supporting said members whereby one is mounted for movement relative to the other about an axis, comprising a driving pulley, a driven pulley, means connecting said pulleys, respectively, with said driving and driven members whereby a line extending coincidental with said axis lies in tangential relation with respect to said pulleys with one of the latter on one side of said axis and the other on the other side of said axis, and a belt trained around said pulleys and arranged so that a portion of said belt lies in said tangent line, whereby swinging movement of one of said members about said axis relative to the other member is accommodated by twisting of the portion of the belt that extends along said tangent line.

13. A belt transmission apparatus adapted to transmit power between a pair of driving and driven members, one of which is supported for movement relative to the other about an axis, comprising a driving pulley, a driven pulley, means connecting said pulleys, respectively, with said driving and driven members whereby a line extending coincidentally with said axis lies in tangential relation with respect to said pulleys with one of the latter on one side of said axis and the other on the other side of said axis, a driving belt trained over said pulleys, and means supported, respectively, for swinging movement with said driving and driven pulleys and serving to dispose portions of said belt in said tangential axis.

TALBERT W. PAUL.

REFERENCES CITED

The following references are of record in the file of this patent:

UNITED STATES PATENTS

| Number | Name | Date |
|---|---|---|
| 417,512 | Rosquist | Dec. 12, 1889 |
| 1,923,611 | Bozarth | Aug. 22, 1933 |
| 2,287,479 | Kelsey | June 23, 1942 |
| 2,306,902 | Rabe | Dec. 29, 1942 |